United States Patent
Wang et al.

(10) Patent No.: US 9,419,449 B2
(45) Date of Patent: Aug. 16, 2016

(54) BATTERY PROTECTION CHIP AND DEVICE FOR CONTROLLING BALANCE OF BATTERY PROTECTION CHIPS

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Xiaoping Wang, Guangdong (CN); Zailin Tu, Guangdong (CN); Qinggang Bai, Guangdong (CN)

(73) Assignees: Shenzhen BYD Auto R&D Company Limited, Shenzhen, Guangdong (CN); BYD Company Limited, Shenzhen, Guangdong (CN)

( * ) Notice: Subject to any disclaimer, the term of this patent is extended or adjusted under 35 U.S.C. 154(b) by 239 days.

(21) Appl. No.: 14/308,688

(22) Filed: Jun. 18, 2014

(65) Prior Publication Data

US 2014/0292280 A1 Oct. 2, 2014

Related U.S. Application Data

(63) Continuation of application No. PCT/CN2012/085877, filed on Dec. 4, 2012.

(30) Foreign Application Priority Data

Dec. 29, 2011 (CN) .......................... 2011 1 0453861

(51) Int. Cl.
*H02J 7/00* (2006.01)
*H01M 10/42* (2006.01)

(52) U.S. Cl.
CPC ........... *H02J 7/0016* (2013.01); *H01M 10/425* (2013.01); *H01M 2010/4271* (2013.01)

(58) Field of Classification Search
CPC .................. H01M 10/425; H01M 2010/4271; H02J 7/0016
USPC .......................................... 320/134, 136, 163
See application file for complete search history.

(56) References Cited

U.S. PATENT DOCUMENTS

| 7,157,881 B1 * | 1/2007 | Benckenstein, Jr. .. | H02J 7/0024 320/116 |
| 2011/0121783 A1 * | 5/2011 | Boyles .................. | H02J 7/0013 320/113 |

FOREIGN PATENT DOCUMENTS

| CN | 101399440 A | 4/2009 |
| CN | 101800433 A | 8/2010 |
| CN | 102684165 A | 9/2012 |
| WO | WO 2013/097584 A1 | 7/2013 |

OTHER PUBLICATIONS

PCT International Search Report and Written Opinion mailed Mar. 14, 2013, issued in International Application No. PCT/CN2012/085877 (12 pages).

* cited by examiner

*Primary Examiner* — Edward Tso
*Assistant Examiner* — Aaron Piggush
(74) *Attorney, Agent, or Firm* — Finnegan, Henderson, Farabow, Garrett & Dunner, LLP (57) ABSTRACT

A battery protection chip may comprise: a first end, configured to output a strong pull up signal when a voltage of at least one battery in a battery pack protected does not reach a balance threshold, and to output a weak pull down signal when voltages of all batteries in the battery pack protected reach the balance threshold; and a second end, configured to output a strong pull down signal when a voltage of at least one battery in a battery pack protected does not reach a balance threshold, and to output a weak pull up signal when voltages of all batteries in the battery pack protected reach the balance threshold.

14 Claims, 5 Drawing Sheets

| BALUP | chip ① | 11 | 11 | 11 | 11 | 0-11 | 0-11 | 0-11 | 0 | BALUP |
|---|---|---|---|---|---|---|---|---|---|---|
| BALDN | | 0 | 0 | 0 | 0 | 1 | 1 | 1 | 1 | HBAL_ALL |
| | | 00 | 00 | 00 | 00 | 1-00 | 1-00 | 1-00 | 1 | BALDN |

| BALUP | chip ② | 11 | 11 | 0-11 | 0-11 | 11 | 11 | 0-11 | 0 | BALUP |
|---|---|---|---|---|---|---|---|---|---|---|
| BALDN | | 0 | 0 | 1 | 1 | 0 | 0 | 1 | 1 | HBAL_ALL |
| | | 00 | 00 | 1-00 | 1-00 | 00 | 00 | 1-00 | 1 | BALDN |

| BALUP | chip ③ | 11 | 0-11 | 11 | 0-11 | 11 | 0-11 | 11 | 0 | BALUP |
|---|---|---|---|---|---|---|---|---|---|---|
| BALDN | | 0 | 1 | 0 | 1 | 0 | 1 | 0 | 1 | HBAL_ALL |
| | | 00 | 1-00 | 00 | 1-00 | 00 | 1-00 | 00 | 1 | BALDN |

Fig. 6

BATTERY PROTECTION CHIP AND DEVICE FOR CONTROLLING BALANCE OF BATTERY PROTECTION CHIPS

CROSS-REFERENCE TO RELATED APPLICATIONS

This application is a continuation of International Application No. PCT/CN2012/085877, filed on Dec. 4, 2012, which claims priority to and benefits of Chinese Patent Application No. 201110453861.1, filed with the State Intellectual Property Office (SIPO) of China on Dec. 29, 2011. The entire contents of the above-referenced applications are incorporated herein by reference.

FIELD

The present disclosure relates generally to an electronic device, and more particularly, to a battery protection chip, and a device for controlling a balance of batteries, and a method for controlling a balance of batteries.

BACKGROUND

Voltages of batteries to be protected by multi-battery protection integrated circuit, or a multi-battery related integrated circuit, are generally different. Multi-battery protection integrated circuit typically comprises a plurality of battery protection chips. In order to prolong a service life of the batteries and to control the batteries in cascade to work in a predetermined state, a device for controlling a balance of batteries is needed.

The traditional device for controlling the balance of battery uses four terminals (ports), which may increase packaging cost and decrease a device performance. In addition, a layout complexity on an external Printed Circuit Board (PCB) may be increased and there may be higher requirements on hardware.

Therefore, there is a need for a battery protection chip which has fewer terminals, and which can control the balance of the battery.

SUMMARY

According to embodiments of the present disclosure, a system for controlling a balance of batteries within a plurality of battery packs comprises a first device and a second device. The first device, which can include a chip having integrated circuit, is configured to monitor voltages of one or more batteries in a first battery pack, to receive information about voltages of one or more batteries of a second battery pack from the second device, to determine whether to start an in-pack balance based on the voltages of one or more batteries in the first battery pack, and to determine whether to start an inter-pack balance based on the information about the voltages of one or more batteries of the second battery pack. The second device, which can include a chip having integrated circuit, is configured to monitor the voltages of one or more batteries in the second battery pack, to receive information about the voltages of one or more batteries of the first battery pack from the first device, to determine whether to start an in-pack balance based on the voltages of one or more batteries in the second battery pack, and to determine whether to start an inter-pack balance based on the information about the voltages of one or more batteries of the first battery pack.

In some embodiments, each device in the system further includes a first end and a second end, and wherein the first end can be in a first pull-up state or in a first pull-down state, and wherein the second end can be in a second pull-down state or in a second pull-up state. The states of the first and the second devices can be determined based respectively on the voltages of one or more batteries in the first and the second battery packs. When a voltage of at least one battery in the first battery pack does not reach a balance threshold, the first end of the first device is configured to be in the first pull-up state and the second end of the first device is configured to be in the second pull-down state.

In some embodiments, the second end of the first device is coupled with the first end of the second device at a first node. When the first end of the second device is in the first pull-up state and when the second end of the first device is in the second pull-up state, the first node is configured to be in a third pull-down state. When the first end of the second device is in the first pull-down state and when the second end of the first device is in the second pull-down state, the first node is configured to be in a third pull-up state. When the first end of the second device is in the first pull-down state and when the second end of the first device is in the second pull-up state, the first node is configured to be in a fourth pull-down state.

According to embodiments of the present disclosure, a device for controlling a balance of batteries within a battery pack is configured to receive information about voltages of one or more batteries of a second battery pack, to determine whether to start an in-pack balance based on voltages of one or more batteries in the first battery pack, and to determine whether to start an inter-pack balance based on the information about voltages of one or more batteries of the second battery pack.

In some embodiments, the device further comprises a first end and a second end, wherein the first end can be in a first pull-up state or in a first pull-down state, and wherein the second end can be in a second pull-down state or in a second pull-up state. The states can be determined by voltages of one or more batteries in the first battery pack. When a voltage of at least one battery in the first battery pack does not reach a balance threshold, the first end is configured to be in the first pull-up state and the second end is configured to be in the second pull-down state. When voltages of all the batteries in the first battery pack reach a balance threshold, the first end is configured to be in the first pull-down state and the second end is configured to be in the second pull-up state.

In some embodiments, the device further comprises a first module and a second module, wherein the first module is configured to transmit a first control signal to the second module, and a balance signal related to the voltages of one or more batteries in the first battery pack, and wherein the second module is configured to transmit a second control signal to the first module and the balance signal. The first module is further configured to generate the state for the first end based on the second control signal and on the balance signal. The second module is further configured to generate the state for the second end based on the first control signal and on the balance signal.

In some embodiments, the first module comprises a first determining unit, configured to generate a first determining signal based on the second control signal and the balance signal. The first module also comprises a pull-up control unit, configured to generate the first strong pull-up state for the first end and to generate a third control signal based on the first determining signal. The first module further comprises a second determining unit, configured to generate a second determining signal based on the third control signal and the first determining signal. The first module also comprises a first control unit, configured to generate the first control signal based on the second determining signal.

In some embodiments, the second module comprises a third determining unit, configured to generate a third determining signal based on the first control signal and the balance signal. The second module also comprises a pull-down control unit, configured to generate the first strong pull-down state for the second end and to generate a fourth control signal and a fifth control signal based on the third determining signal. The second module further comprises a fourth determining unit, configured to generate a fourth determining signal based on the fourth control signal, the fifth control signal and the third determining signal. The second module also comprises a second control unit, configured to generate the second control signal based on the fourth determining signal.

In some embodiments, the device further comprises a balance determining module, configured to determine whether to start the in-pack balance based on the voltages of the batteries in the battery, and to determine whether to start the inter-pack balance based on the first control signal and the second control signal.

In some embodiments, the device is part of a battery protection chip. In some embodiments, the device is a battery protection chip.

The battery protection chip according to an embodiment of the present disclosure only has two ends, which may reduce a complexity of packaging battery protection chips as well as reduce packaging cost. In addition, as external ends of the packaged battery protection chip according to the present disclosure are less, it may simplify a connection with other devices such as other battery protection chips, and facilitate a layout on an external PCB.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions made with reference the accompanying drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In one embodiment of the present disclosure, the system for controlling a balance of batteries in a plurality of battery packs comprises a plurality of battery protection chips connected in series, in which each of the battery protection chips has a first end and a second end, the first end of a first battery protection chip is connected to the second end of a second battery protection chip, the second end of the first battery protection chip is connected to the first end of a third battery protection chip, when a voltage of at least one battery in a battery pack protected by one battery protection chip of the plurality of battery protection chips does not reach a balance threshold, a strong pull up signal is output from the first end of the one battery protection chip and a strong pull down signal is output from the second end of the one battery protection chip; when voltages of all batteries in the battery pack protected by the one battery protection chip of the plurality of battery protection chips reach the balance threshold, a weak pull down signal is output from the first end of the one battery protection chip and a weak pull up signal is output from the second end of the one battery protection chip; when the strong pull down signal is output from the second end of the second battery protection chip and the weak pull down signal is output from the first end of the first battery protection chip, the weak pull down signal from the first end of the first battery protection chip is forced to become the strong pull up signal; when the strong pull up signal is output from the first end of the third battery protection chip and the weak pull up signal is output from the second end of the first battery protection chip, the weak pull up signal from the second end of the first battery protection chip is forced to become the strong pull down signal; and when the weak pull up signal is output from the second end of the second battery protection chip and the weak pull down signal is output from the first end of the first battery protection chip, the weak pull up signal from the second end of the second battery protection is forced to become the strong pull down signal.

The strong pull up signal means that the voltage of the first end is pulled up to a total voltage VCC of the batteries; the weak pull down signal means that the voltage of the first end is pulled down to a first low level; the strong pull down signal means that the voltage of the second end is pulled down to a second low level; the weak pull up signal means that the voltage of the second end is pulled up to a high level.

Because each battery protection chip in the device for controlling a balance of battery protection chips according to an embodiment of the present disclosure has two ends, it may reduce a complexity of packaging battery protection chips as well as reduce packaging cost. In addition, as external ends of the packaged battery protection chip according to the present disclosure are less, it may simplify a connection with other devices such as other battery protection chips, and facilitate a layout on an external PCB.

In the following, embodiments of the device for controlling a balance of battery protection chips will be described in detail with reference to accompanied drawings.

Figure 1:
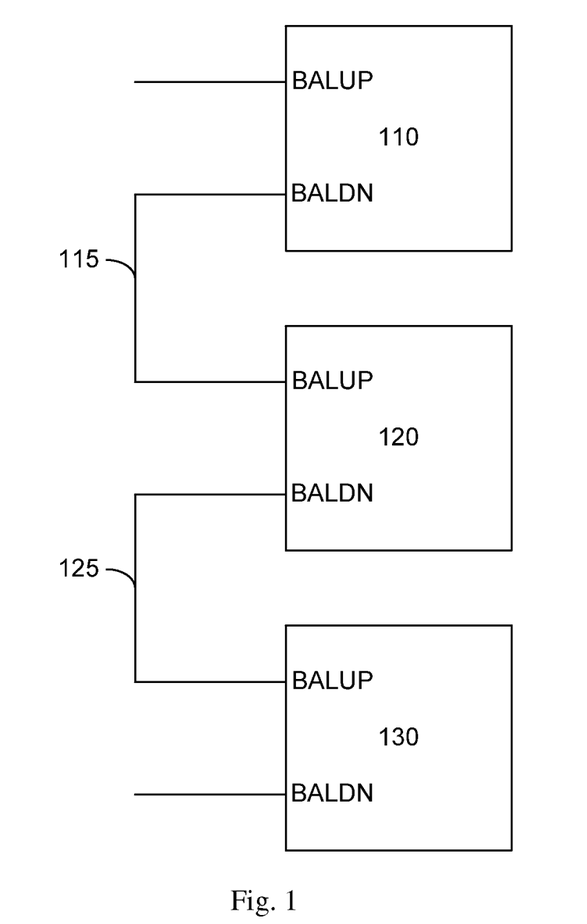
FIG. 1 illustrates an exemplary system for controlling a balance of batteries for a plurality of battery packs, according to an embodiment of the present disclosure.

As shown in FIG. 1, according to an embodiment of the present disclosure, the system for controlling a balance of batteries in a plurality of battery comprises three battery protection chips 110, 120, and 130. Each battery protection chip has a first end BALUP and a second end BALDN. Chips 110, 120, and 130 are connected in series. In some embodiments, the first end BALUP of chip 120 is connected to the second end BALDN of chip 110 at a node 115, and the second end BALDN of chip 120 is connected to the first end BALUP of chip 130 at a node 125. In some embodiments, each of battery protection chips 110, 120, and 130 controls a battery pack comprising a plurality of batteries.

In some embodiments, when a voltage of at least one battery in the battery pack protected by one battery protection chip (for example, battery protection chip 110) does not reach a balance threshold, a strong pull up signal may be output from the first end BALUP of the battery protection chip, and a strong pull down signal may be output from the second end BALDN of the battery protection chip. When voltages of all batteries in the battery pack protected by the battery protection chip reach the balance threshold, a weak pull down signal may be output from the first end BALUP of the battery protection chip, and a weak pull up signal may be output from the second end BALDN of the battery protection chip.

In some embodiments, when strong pull down signal is output from second end BALDN of chip 110 and a weak pull down signal is output from first end BALUP of chip 120, the weak pull down signal from first end BALUP of chip 120 can be forced to become a strong pull up signal at node 115. When a strong pull up signal is output from first end BALUP of chip 130 and a weak pull up signal is output from second end BALDN of chip 120, the weak pull up signal from second end BALDN of chip 120 can be forced to become a strong pull down signal at node 125. When a weak pull up signal is output from second end BALDN of chip 110 and a weak pull down signal is output from the first end BALUP of chip 120, the weak pull up signal from second end BALDN of the chip 110 can be forced to become a strong pull down signal at node 115.

In some embodiments, each battery protection chip can determine whether to start an in-pack balance based on voltages of batteries in the battery pack to be protected, and can determines whether to start an inter-pack balance based on signals from first end BALUP and second end BALDN thereof. The details will be described hereinafter with reference to FIGS. 2-6.

Figure 2:
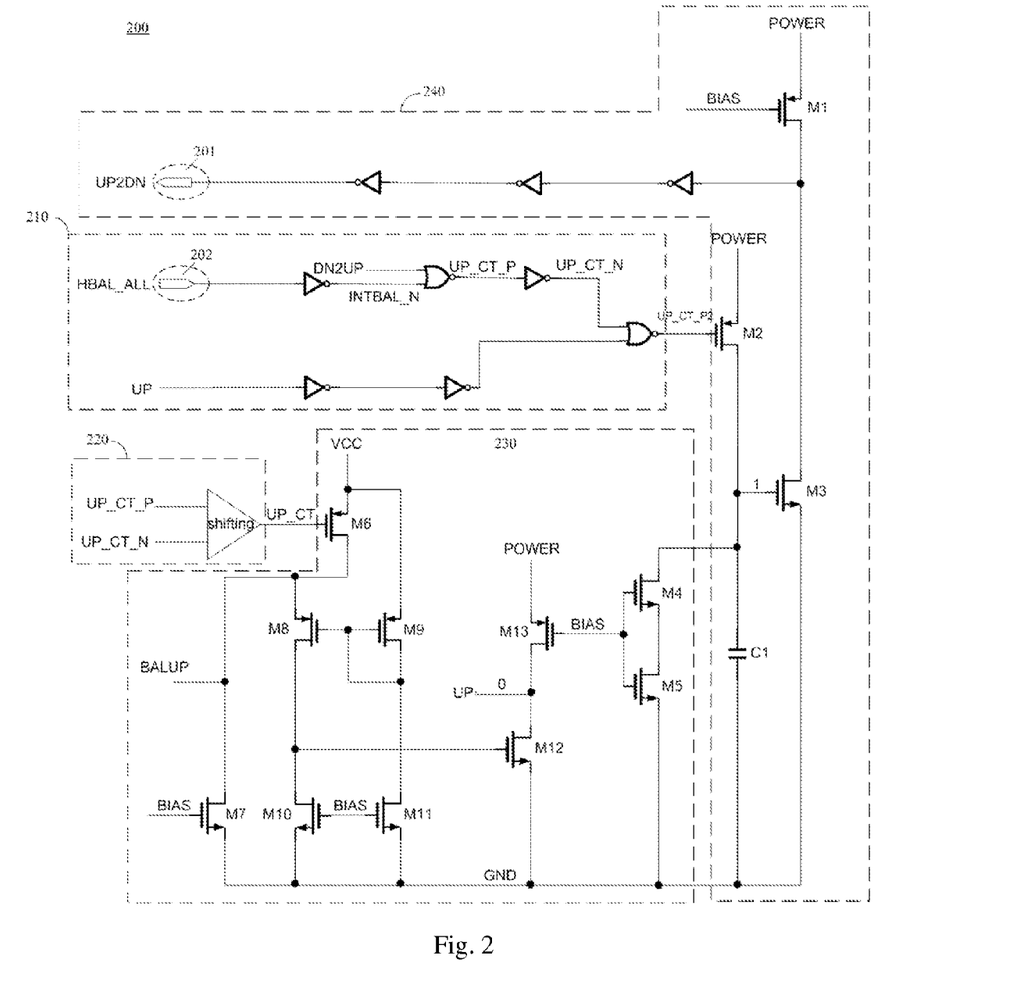
FIG. 2 illustrates an exemplary circuit schematic diagram showing a first module of a battery protection chip according to an embodiment of the present disclosure.
Figure 3:
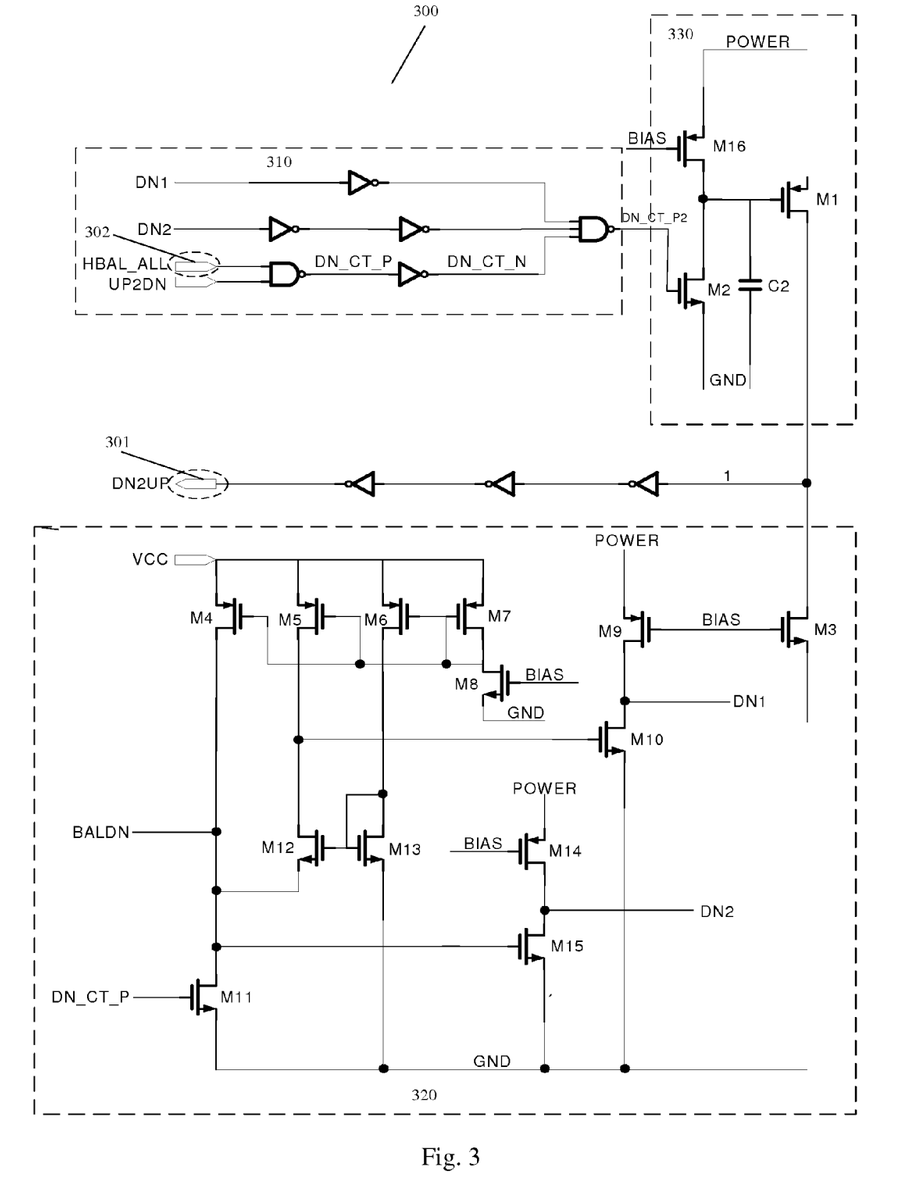
FIG. 3 illustrates an exemplary circuit diagram showing a second module of a battery protection chip according to an embodiment of the present disclosure.

FIG. 2 is a circuit schematic diagram showing a first module of a battery protection chip, according to an embodiment of the present disclosure. FIG. 3 is a circuit diagram showing a second module of a battery protection chip, according to an embodiment of the present disclosure.

Referring to FIGS. 2 and 3, according to an embodiment of the present disclosure, each battery protection chip may comprise a first module 200 and a second module 300. First module 200 outputs a first control signal UP2DN via a first control end 201 to the second module 300, and second module 300 outputs a second control signal DN2UP via a second control end 301 to the first module 200.

In some embodiments, first module 200 includes a balance signal end 202 to receive a balance signal HBAL_ALL. When voltages of all batteries in the battery pack to be protected by the battery protection chip reach the balance threshold, balance signal HBAL_ALL can be at a high signal level. When a voltage of at least one battery in the battery pack to be protected by the battery protection chip does not reach the balance threshold, balance signal HBAL_ALL can be at a low signal level. First module 200 can generate a state of first end BALUP of the battery protection chip based on the signal level of balance signal end 202 and the signal level of second control signal DN2UP. When balance signal end 202 is at a low level, first module 200 can output a strong pull up signal at first end BALUP based on second control signal DN2UP. When balance signal end 202 is at a high level, first module 200 can output a weak pull down signal at first end BALUP. First control end 201 can also output a certain signal level for first control signal UP2DN based on second control signal DN2UP.

In some embodiments, second module 300 includes balance signal end 302 to receive balance signal HBAL_ALL. Second module 300 can also generate a state of second end BALDN of the battery protection chip based on the signal level of balance signal end 302 and the signal level of first control signal UP2DN. When balance signal end 302 is at a low level, second module 300 can output a strong pull down signal based at second end BALDN based on first control signal UP2DN. When balance signal end 302 is at a high level, second module 300 can output a weak pull up signal at second end BALDN. Second module 300 can also output a certain signal level for second control signal DN2UP based on first control signal UP2DN, wherein UP2DN has a different state than DN2UP.

Referring to FIG. 2, in one embodiment, first module 200 may comprise a first determining unit 210, a level shifting unit 220, a pull-up control unit 230 and a first control unit 240. The first determining unit 210 is configured to generate a first determining signal UP_CT_P based on second control signal DN2UP and balance signal HBAL_ALL. Level shifting unit 220 is configured to generate a level shifting signal UP_CT based on first determining signal UP_CT_P. Pull-up control unit 230 is configured to generate a pull up signal for BALUP? and a third control signal UP based on level shifting signal UP_CT, in which the pull up signal has a different state than third control signal UP. First determining unit 210 is further configured to generate a second determining signal UP_CT_P2 based on third control signal UP and first determining signal UP_CT_P. First control unit 240 is configured to generate first control signal UP2DN based on second determining signal UP_CT_P2.

Referring to FIG. 3, in one embodiment, second module 300 may comprise a second determining unit 310, a pull-down control unit 320 and a second control unit 330. Second determining unit 310 is configured to generate a third determining signal DN_CT_P based on first control signal UP2DN and balance signal HBAL_ALL. Pull-down control unit 320 is configured to generate a pull down signal for BALDN?, a fourth control signal DN1 and a fifth control signal DN2 based on third determining signal DN_CT_P. Second determining unit 310 is further configured to generate a fourth determining signal DN_CT_P2 based on fourth control signal DN1, fifth control signal DN2. and third determining signal DN_CT_P. Second control unit 330 is configured to generate second control signal DN2UP based on the fourth determining signal DN_CT_P2.

Figure 4:
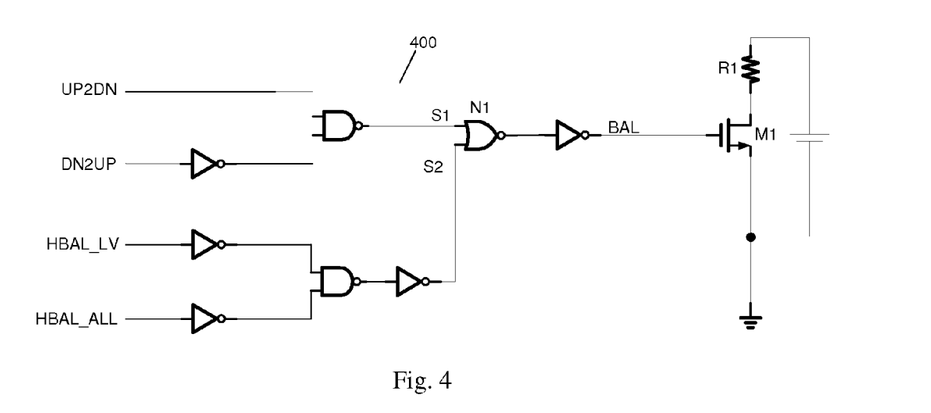
FIG. 4 illustrates an exemplary circuit diagram showing a balance determining module of a battery protection chip according to an embodiment of the present disclosure.

FIG. 4 is a circuit diagram showing a balance determining module of a battery protection chip according to an embodiment of the present disclosure. Referring to FIG. 4, in some embodiments, the battery protection chip may further comprise a balance determining module 400. Balance determining module 400 can be connected to first control end 201, second control end 301, and balance signal end 202 respectively, and is configured to determine whether to start the in-pack balance based on the voltages of the batteries in the battery pack to be protected by the battery protection chip, and to determine whether to start the inter-pack balance based on first control signal UP2DN and second control signal DN2UP.

In the following, the operation of first module 200 and second module 300 of a battery protection chip according to embodiments of the present disclosure will be described in detail with reference to FIGS. 2-3. In FIGS. 2 and 3, pin VCC can be at a level substantially equal to a total voltage of the batteries in the pack, which is typically 10~20V. POWER can be connected to an internal logic power of the battery protection chip, which is typically at a voltage level of 4 V. GND can be a ground of the battery protection chip, while BIAS can be connected to a bias voltage.

First, the operation of first module 200 and second module 300 when balance signal HBAL_ALL is at a low level signal will be described in detail.

Referring to determining unit 210 in FIG. 2, when balance signal HBAL_ALL is at a low level signal, INTHBAL_ALL, which is generated by inverting HBAL_ALL, becomes a high level signal. Second control signal DN2UP can be at a low signal level. First determining signal UP_CT_P, obtained from a NOR gate with at least one input at high signal level (e.g. high signal level INTHBAL_ALL), can be at a low signal level. First determining signal UP_CT_P can be level-shifted by level shifting unit 220 to obtain signal UP_CT, which is also at a low signal level when UP_CT_P is low.

Referring to pull-up control unit 230 in FIG. 2, UP_CT_P is connected to the gate of M6, and M6 can be turned on when UP_CT_P is low. Thus, first end BALUP can be pulled up to VCC, and BALUP can output a strong pull up signal. With M6 conducting, M8 can also be turned on. In some embodiments, if the pull up ability of M8 is stronger than the pull down ability of M10, M8 can pull the gate voltage of M12 to a high signal level, and M12 can be turned on. M12 may pull third control signal UP down to GND.

Referring back to determining unit 210 in FIG. 2, third control signal UP can then pass through two inverters with its low signal level maintained, before being input into one input of a two-input NOR gate. The other input of the NOR gate receives signal UP_CT_N, and the NOR gate is to generate a second determining signal UP_CT_P2. Recall that UP_CT_P is at low level, and UP_CT_N (inversion of UP_CT_P) is at high level, the NOR gate may generate a low signal level for second determining signal UP_CT_P2.

Referring to first control unit 240 in FIG. 2, UP_CT_P2 is connected to the gate of M2. With UP_CT_P2 at a low signal level, M2 can be turned on to pull the gate of M3 to a high level, and M3 can be turned on. The drain of M3 can be pulled down to a low level signal, which passes through three inverters to output a high signal level for first control signal UP2DN. UP2DN is then output to second module 300.

Referring to determining unit 310 in FIG. 3, when balance signal HBAL_ALL is at a low signal level and first control signal UP2DN is generated at a high signal level, as discussed above, third determining signal DN_CT_P, obtained after HBAL_ALL and UP2DN pass through a NAND gate, can be at a high signal level.

Referring to pull-down control unit 320 in FIG. 3, with DN_CT_P connected to the gate of M11, a high DN_CT_P can turn on M11 to pull second end BALDN down to a low level, and BALDN can output a strong pull down signal. With M11 conducting, M12 can also be turned on. As the pull up ability of M5 is stronger than the pull down ability of M12, M5 can pull the gate level of M10 to a high level to turn on M10, which can then pull down fourth control signal DN1 to GND. Also, with M11 turned on, the gate of M15 can be pulled down to GND, and M15 can be turned off. M14 can then pull fifth control signal DN2 up to a high signal level.

Referring back to determining unit 310 in FIG. 3, DN1 is inverted to be at high signal level before being input to the first input of a three-input NAND gate. DN2 passes through two inverters and has its high signal level maintained before being input to the second input of the NAND gate. DN_CT_N, generated from HBAL_ALL and UP2DN, is input to the third input of the NAND gate and is at a low signal level. Thus, the fourth determining signal DN_CT_P2 obtained at the output of the NAND gate is at a high signal level signal.

Referring to second control unit 330 in FIG. 3, the gate of M2 is connected to DN_CT_P2. With DN_CT_P2 at high level, M2 can be turned on. Thus the gate of M1 is at low level, and M1 can be turned on to pull up its drain to a high signal level, which can then pass through three inverters to get a low signal level for second control signal DN2UP. DN2UP can then be output to first module 200. Then, the operation of first module 200 and second module 300, when balance signal HBAL_ALL is at high signal level, will be described in detail.

Referring to FIG. 2 again, when HBAL_ALL is at a high signal level, INTBAL_N can become low. If second control signal DN2UP is also low, UP_CT_P, obtained after inputting a low DN2UP and a low INTBAL_N to the NOR gate, can be at a high signal level. Then a high UP_CT_P can be input to the level shifting unit 220 level-shift it to a high UP_CT, which can then turn off M6. With M6 not conducting current, BALUP can be pulled down to a low level to output a weak pull down signal. M8 can be turned off as well, and M10 can pull the gate voltage of M12 to a low level, and M12 can be turned off. Thus third control signal UP can be pulled up to a high signal level. The UP signal can then pass through two inverters, with its high signal level maintained, which is provided to one input of the two-input NOR gate. The other input of the NOR gate can receive signal UP_CT_N, which is the inverted UP_CT_P and can be low, and the NOR gate can output second determining signal UP_CT_P2 at a low level. The low UP_CT_P2 can then turn on M2 and to pull the gate voltage of M3 up to be a high level to turn on M3. If the pull-down ability of M3 is stronger than the pull-up ability of M1, the drain of M3 can output a low level signal which passes through three inverters to output first control signal UP2DN at a high level. UP2DN can then be output to second module 300.

Referring to FIG. 3 again, when HBAL_ALL is a high signal level, and with the UP2DN from first module 200 also at a high level, third determining signal DN_CT_P, obtained from the two-input NAND gate which receives the high HBAL_ALL and high UP2DN as inputs, can be at a low level. With the gate of M11 connected to DN_CT_P, M11 can be turned off, thus BALDN can be pulled up to a high level by M4 and outputs a weak pull up signal. The drain level of M12 can also be pulled up by M5, which can then pull up the gate voltage of M10 to turn on M10. Thus fourth control signal DN1 can be pulled down to a low level signal. With M11 turned off, gate voltage of M15 can also be pulled up to a high level to turn on M15. Thus, fifth control signal DN2 can be pulled down to a low level signal. DN1 can then be inverted to become a high level signal before being provided to the first input of the three-input NAND gate, and DN2, after passing through two inverters, can remain at low level before being provided to the second input of the NAND gate, while DN_CT_N, which can become high after low DN_CT_P is inverted, is provided to the third input of the three-input NAND gate. Thus, fourth determining signal DN_CT_P2, obtained at the output of the three-input NAND gate, can be at a high level. High DN_CT_P2 can then turn on M2, which can then pull down the gate voltage of M1 to turn on M1. The drain of M1 can then output a high signal level, which passes through three inverters to generate a low signal level for second control signal DN2UP. The low DN2UP can then be output to first module 200.

From the above description, it can be understood that with regard to each battery protection chip, when balance signal HBAL_ALL is low, first end BALUP can output a strong pull up signal, second end BALDN can output a strong pull down signal, third control signal UP can be low, fourth control signal DN1 can be low, fifth control signal DN2 can be high, first control signal UP2DN can be high, and second control signal DN2UP can be low.

On the other hand, when HBAL_ALL is high, first end BALUP can output a weak pull down signal, second end BALDN can output a weak pull up signal, third control signal UP can be high, fourth control signal DN1 can be low, fifth control signal DN2 can be low, and second control signal DN2UP can be low.

Further, it can also be understood that with regard to each protection chip, the states of first end BALUP and second end BALDN can be controlled by balance signal HBAL_ALL. First end BALUP has two states of strong pull up and weak pull down, and second end BALDN has two states of strong pull down and weak pull up. A person with ordinary skill in the art will understand that "pull down" and "pull up" are relative terms, wherein a "pull down" voltage is at a lower voltage level than a "pull up" voltage.

Referring to FIG. 1, there are four connection conditions: (a) when BALDN of chip 110 outputs strong pull down and BALUP of chip 120 outputs strong pull up, and both the states of the second end BALDN of chip 110 and the first end BALUP of chip 120 keep unchanged; (b) when BALDN of chip 110 outputs strong pull down, and BALUP of chip 120 outputs weak pull down, the state of BALDN of chip 110 can keep unchanged, while the state of BALUP of chip 120 can be forced to become strong pull up; (c) when BALDN of chip 110 outputs weak pull up and BALUP of chip 120 outputs strong pull up, the state of BALUP of chip 120 can keep unchanged, while the state of BALDN of chip 110 can be forced to become strong pull down; (d) when BALDN of chip 110 outputs weak pull up, and BALUP of chip 120 outputs weak pull down, the state of BALUP of chip 120 can keep unchanged, while the weak pull up signal from BALDN of chip 110 can be forced to become a strong pull down signal. According to embodiments of the present disclosure, a weak signal can be overcome to become a strong signal under the action of another strong signal. For simplicity, the explanation of (b) and (c) will not be described in detail. With respect to the condition (d), referring to FIGS. 2 and 3, when BALDN outputs a weak pull up and BALUP outputs a weak pull down signal, M4 of pull-down control unit 320 can be turned on and M11 of pull-down control unit 320 can be turned off, while M6 of pull-up control unit 230 can be turned off and M7 of pull-up control unit 230 can be turned on. If the pull down ability of M7 is stronger than the pull up ability of M4 because, for example, the M7 has more transistors connected together in parallel than M4, the voltage of the second end BALDN is pulled down to a value closer to or below ground, and a weak pull up signal at BALDN can be overcome to become a strong pull down signal.

Figure 5:
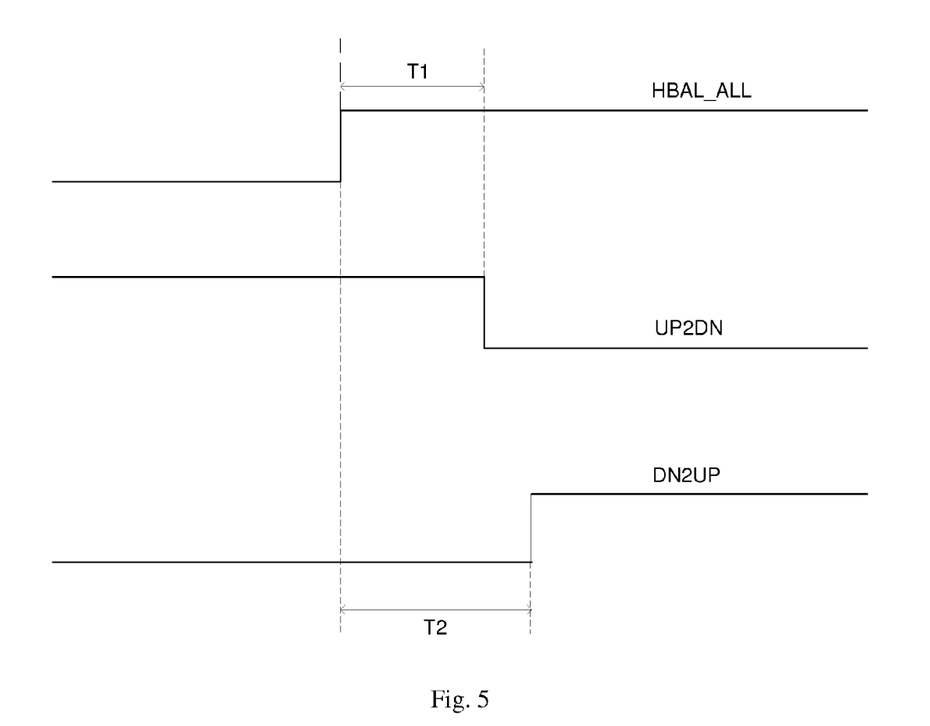
FIG. 5 is a timing diagram showing an exemplary delay of signals input into the balance determining module according to an embodiment of the present disclosure.

In some embodiments, in order to avoid logic errors, delay capacitors C1 and C2 may be added to the first module 200 and 300 respectively, which can introduce a certain delay T1 and T2 to first control signal UP2DN and second control signal DN2UP respectively before they change, as shown in FIG. 5, which is a schematic diagram showing a delay of signals input into the balance determining module according to an embodiment of the present disclosure.

Next, the operation of balance determining module 400 of each battery protection chip will be described in detail with reference to FIG. 4.

As shown in FIG. 4, a signal HBAL_LV is the output signal from a comparator (not shown) which compares the voltage of each battery with the balance threshold. When the voltage of the battery is below the balance threshold, signal HBAL_LV can be at a high signal level. When the voltage of the battery is above the balance threshold, HBAL_LV can be at a low signal level. Moreover, as described above, when the voltage of at least one battery in the battery pack protected by the battery protection chip does not reach the balance threshold, the balance signal HBAL_ALL can be at low, first control signal UP2DN can be high, and second control signal DN2UP can be low. With high UP2DN and inverted DN2UP (which becomes high) fed to a NAND gate, the output of the NAND gate, which is received by a signal S1 input into a NOR gate N1, can be low, which means the output of NOR gate N1 can be determined by the other input of the NOR gate, the S2 input. With S2 input determined by HBAL_LV and HBAL_ALL, balance control signal BAL, which is generated from the output of NOR gate N1, can be determined by the voltage of the battery.

Further, when HBAL_ALL is high, HBAL_LV can be low. Thus, the signal S2 input to NOR gate N1 can be low, and the output of NOR gate N1, as well as balance control signal BAL, can be determined by S1 input, which means balance control signal BAL can be determined by first control signal UP2DN and second control signal DN2UP. The states of each signal are shown in the following table, in which "0" represents the low level signal, "1" represents the high level signal:

| HBAL_ALL | HBAL_LV | UP2DN | DN2UP | BAL |
|---|---|---|---|---|
| 0 | 1 | 1 | 0 | 0 |
| 0 | 0 | 1 | 0 | 1 |
| 1 | 0 | 0 | 0 | 1 |
| 1 | 0 | 0 | 1 | 1 |
| 1 | 0 | 1 | 0 | 0 |
| 1 | 0 | 1 | 1 | 1 |

Referring to FIG. 4, when balance control signal BAL is low, M1 can be turned off, which can indicate that balance has not started. When balance control signal BAL is high, M1 can be turned on, which can indicate that in-pack balance has started by, for example, forming a discharging circuit with M1 and a resistance R1. The discharging circuit may discharge the battery to bring its voltage to a value lower than the balance threshold.

In the following, the starting state of the in-pack balance and the inter-pack balance will be described in detail with reference to the embodiment shown in FIG. 1. With regard to the three battery protection chips in FIG. 1, there are eight states as shown in the following table:

| HBAL_ALL of chip 110 | HBAL_ALL of chip 120 | HBAL_ALL of chip 130 | state |
|---|---|---|---|
| 0 | 0 | 0 | A |
| 0 | 0 | 1 | B |
| 0 | 1 | 0 | C |
| 0 | 1 | 1 | D |
| 1 | 0 | 0 | E |
| 1 | 0 | 1 | F |
| 1 | 1 | 0 | G |
| 1 | 1 | 1 | H |

In state A, all balance signals HBAL_ALL of chips 110, 120, and 130 are low level signals, all the first ends BALUP of chips 110, 120, and 130 can output the strong pull up signals, and all the second ends BALDN of chips 110, 120, and 130 can output the strong pull down signals. Furthermore, as all the logic states of chips 110, 120, and 130 keep unchanged, they may not affect each other and may not start the inter-pack balance. Whether to start the in-pack balance may depend on the voltage of each battery in the battery pack. When the voltage of the battery is higher than the balance threshold, the in-pack balance can be started.

In state B, the balance signal HBAL_ALL of chip 130 is high, but the balance signals HBAL_ALL of chips 110 and 120 are low. Thus, the first ends BALUP of chips 120 and 110 can output strong pull up signals, the second ends BALDN of chips 120 and 110 can output strong pull down signals, but the first end BALUP of chip 130 may output weak pull down signal. Therefore, chips 120 and 110 may not affect each other and the inter-pack balances thereof are not started. But as the strong pull down signal from the second end BALDN of chip 120 is connected to the weak pull down signal from the first end BALUP of chip 130, the weak pull down signal from the first end BALUP of chip 130 may be forced to become a strong pull up signal, and the first control signal UP2DN of chip 130 may be changed to low level from high level. Thus, the balance control signal BAL of chip 130 can be changed to be high level, which may start the inter-pack balance of chip 130, wherein all the batteries in the battery pack to be protected by chip 130 may start the balance. In addition, with regard to chips 120 and 110, when the voltage of the battery is higher than the balance threshold, their in-pack balance can start.

In state C, the balance signal HBAL_ALL of chip 120 is high, while the balance signals HBAL_ALL of chip 110 and chip 130 are low. Thus, the first ends BALUP of chips 110 and 130 may output strong pull up signal, the second ends BALDN of chips 110 and 130 may output strong pull down signal, but the first end BALUP of chip 120 may output weak pull down signal, and the second end BALDN of chip 120 may output weak pull up signal. Therefore, as the strong pull down signal from the second end BALDN of chip 110 is connected to the weak pull down signal from the first end BALUP of chip 120 and the strong pull up signal from the first end BALUP of chip 130 is connected to the weak pull up signal from the second end BALDN of chip 120, the weak pull down signal from BALUP of chip 120 can be forced to become a strong pull up signal, while the weak pull up signal from the BALDN of chip 120 can be forced to become a strong pull down signal, and the first control signal UP2DN of chip 120 can be changed to become low level from high level. Thus, the balance control signal BAL of chip 120 can be changed to be at high level signal, which starts the inter-pack balance of chip 120. In addition, with regard to chips 130 and 110, when the voltage of the battery is higher than the balance threshold, the in-pack balance can be started.

The starting of the inter-pack balance and the in-pack balance in states E and F are similar to that in states B and C respectively. For simplicity, the starting of the inter-pack balance and the in-pack balance in state E and F will not be described in detail.

In state D, the balance signal HBAL_ALL of chip 110 is low, while the balance signals HBAL_ALL of chips 120 and 130 are at high level. Thus, as the strong pull down signal from the second end BALDN of chip 110 is connected to the weak pull down signal from the first end BALUP of chip 120, the weak pull down signal from the first end BALUP of chip 120 can be forced to become a strong pull up signal, and the first control signal UP2DN of chip 120 can be changed to become low level, and then the inter-pack balance of chip 120 can start, and a strong pull down signal can be output from the second end BALDN of chip 120. Similarly, the strong pull down signal from the second end of chip can also force the weak pull up signal from the first end of chip 130 to become a strong pull down signal, and the first control signal UP2DN of chip 130 can be changed to become low level, and then the inter-pack balance of chip 130 can start. In addition, with regard to chip 110, when the voltage of the battery is higher than the balance threshold, in-pack balance can start.

The starting of the inter-pack balance and the in-pack balance in state G is similar to that in state D. For simplicity, the starting of the inter-pack balance and the in-pack balance in state G will not be described in detail.

In state H, all the balance signals HBAL_ALL of chips 110, 120, and 130 are the high level signals, thus all the first ends BALUP of chips 110, 120, and 130 may output the pull down signals, and all the second ends BALDN of chips 110, 120, and 130 may output the pull up signals. As described above, the weak pull down ability of the first end BALUP can be much stronger than the weak pull up ability of the second end BALDN, thus when the weak pull up signal from the second end BALDN is connected to the weak pull down signal from the first end BALUP, the level of the second end BALDN will be pulled down to a value closer to the ground. Referring to FIG. 3, when the level of the second end BALDN is close to ground, M12 can be turned on, which makes the gate voltage of M10 low. M10 can be turned off, and fourth control signal DN1 output from M10 can be high. With BALDN pulled down, M15 can also be turned off, and fifth control signal DN2 output from M15 can be high. After logic processing, second control signal DN2UP can be at low level and first control signal UP2DN can be at high level signal, which can then set balance control signal BAL to be at low level, and thus the balance is not started. Therefore, for state H, the inter-pack balance of chip 110 is not started, the inter-pack balance of chip 120 is not started either. In addition, as the states of both the ends of chip 130 keep unchanged, the inter-pack balance of chip 130 is not started either.

In conclusion, the starting states of the inter-pack balance of chips 110, 120 and 130 are shown in the following table:

| Chip 110 | Chip 120 | Chip 130 | Inter-pack balance of chip 110 | Inter-pack balance of chip 120 | Inter-pack balance of chip 130 |
| --- | --- | --- | --- | --- | --- |
| 0 | 0 | 0 | Not started | Not started | Not started |
| 0 | 0 | 1 | Not started | Not started | started |
| 0 | 1 | 0 | Not started | started | Not started |
| 0 | 1 | 1 | Not started | started | started |
| 1 | 0 | 0 | started | Not started | Not started |
| 1 | 0 | 1 | started | Not started | started |
| 1 | 1 | 0 | started | started | Not started |
| 1 | 1 | 1 | Not started | Not started | Not started |

Figure 6:
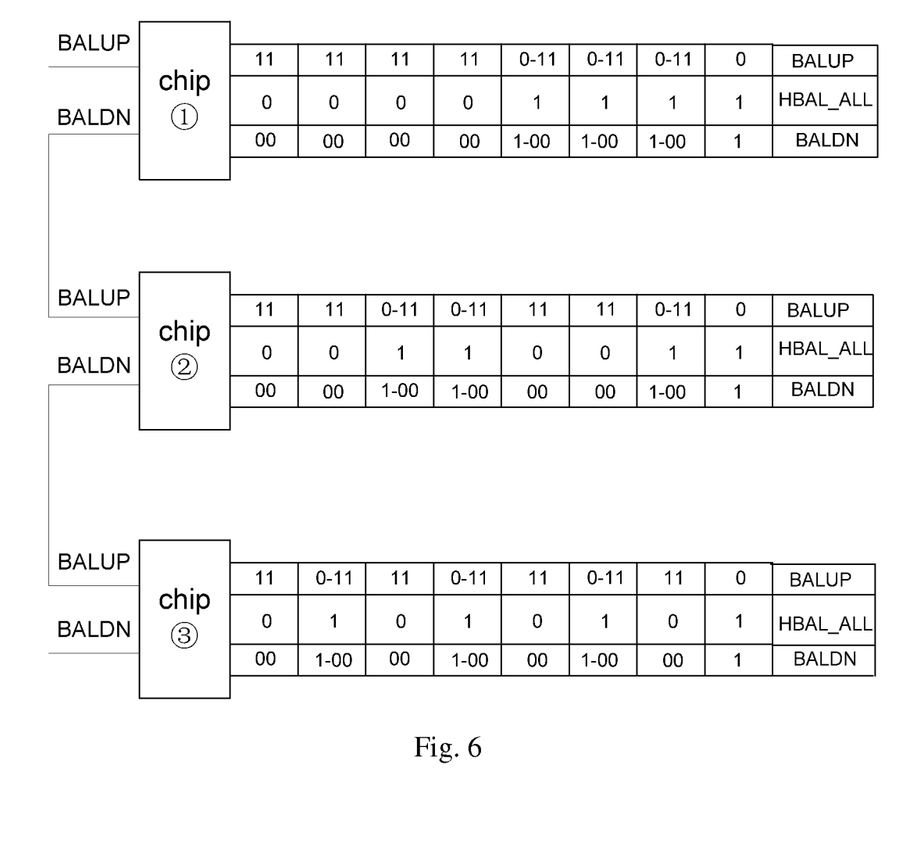
FIG. 6 illustrates the exemplary logic states of battery protection chips according to an embodiment of the present disclosure.

FIG. 6 is a schematic diagram showing a logic state of battery protection chips according to an embodiment of the present disclosure. As shown in FIG. 6, for the first end BALUP and the second end BALDN, "11" represents the strong pull up signal, "1" represents the weak pull up signal, "00" represents the strong pull down signal, "0" represent the weak pull down signal, "0-11" represents the weak pull down signal from the first end BALUP is forced to become the strong pull up signal, and "1-00" represents the weak pull up signal from the second end BALDN is forced to become the strong pull down signal; for the balance signal HBAL_ALL, "0" represents the low level signal, and "1" represents the high level signal.

According to another embodiment of the present disclosure, a battery protection chip for protecting a battery pack with a plurality of batteries is provided as well.

As shown in FIG. 1, the battery protection chip may comprise a first end BALUP and a second end BALDN. The first end BALUP is configured to output a strong pull up signal when a voltage of at least one battery in a battery pack protected by the battery protection chip does not reach a balance threshold, and to output a weak pull down signal when voltages of all batteries in the battery pack protected by the battery protection chip reach the balance threshold. The second end BALDN is configured to output a strong pull down signal when a voltage of at least one battery in the battery pack protected by the battery protection chip does not reach the balance threshold, and to output a weak pull up signal when voltages of all batteries in the battery pack protected reach the balance threshold. Further, the first end of the battery protection chip is connected to a second end of a second battery protection chip, the second end of the battery protection chip is connected to a first end of a third battery protection chip. When the strong pull down signal is output from the second end of the second battery protection chip and the weak pull down signal is output from the first end of the battery protection chip, the weak pull down signal from the first end of the battery protection chip is forced to become the strong pull up signal; when the strong pull up signal is output from the first end of the third battery protection chip and the weak pull up signal is output from the second end of the battery protection chip, the weak pull up signal from the second end of the battery protection chip is forced to become the strong pull down signal; and when the weak pull up signal is output from the second end of the second battery protection chip and the weak pull down signal is output from the first end of the battery protection chip, the weak pull up signal from the second end of the second battery protection is forced to become the strong pull down signal.

Referring to FIG. 2 and FIG. 3, the battery protection chip may further comprise a balance signal end 202 configured to receive a balance signal HBAL_ALL. The balance signal HBAL_ALL is a high level signal when voltages of all batteries in the battery pack protected reach the balance threshold, and the balance signal HBAL_ALL is a low level signal when a voltage of at least one battery in a battery pack protected does not reach the balance threshold.

Referring to FIG. 2 and FIG. 3, in some embodiments, the battery protection chip may comprise a first module 200 and a second module 300. The first module 200 sends a first control signal UP2DN from a first control end 201 to the second module 300; the second module 300 sends a second control signal DN2UP from a second control end 301 to the first module 200.

The first module 200 has the first end BALUP and the balance signal end 202, is configured to control the first end BALUP to output the strong pull up signal based on the second control signal DN2UP when the balance signal end 202 receives the balance signal HBAL_ALL as the low level signal, and is configured to control the first end BALUP to output the weak pull down signal and to control the first control end 201 to output the first control signal UP2DN based on the second control signal DN2UP when the balance signal end 202 receives the balance signal HBAL_ALL as the high level signal.

The second module 300 has the second end BALDN and the balance signal end 202, is configured to control the second end BALDN to output the strong pull down signal based on the first control signal UP2DN when the balance signal end 202 receives the balance signal HBAL_ALL as the low level signal, and is configured to control the second end BALDN to output the weak pull up signal and to control the second control end 301 to output the second control signal DN2UP based on the first control signal UP2DN when the balance signal end 202 receives the balance signal HBAL_ALL as the high level signal, in which the first control signal UP2DN has a different state than the second control signal DN2UP.

Referring to FIG. 2 again, in one embodiment, the first module 200 comprises a first determining unit 210, a level shifting unit 220, a pull-up control unit 230 and a first control unit 240. The first determining unit 210 is configured to generate a first determining signal UP-CT-P based on the second control signal DN2UP and the balance signal HBAL_ALL. The level shifting unit 220 is configured to generate a level shifting signal UP_CT based on the first determining signal UP-CT-P. The pull-up control unit 230 is configured to generate a pull up signal and a third control signal UP based on the level shifting signal UP_CT, in which the pull up signal has a different state than the third control signal UP and the first determining unit 210 is further configured to generate a second determining signal UP_CT_P2 based on the third control signal UP and the first determining signal UP_CT_P. The first control unit 240 is configured to generate the first control signal UP2DN based on the second determining signal UP_CT_P2.

Referring to FIG. 3 again, in one embodiment, the second module 300 comprises a second determining unit 310, a pull-down control unit 320 and a second control unit 330. The second determining unit 310 is configured to generate a third determining signal DN_CT_P based on the first control signal UP2DN and the balance signal HBAL_ALL. The pull-down control unit 320 is configured to generate a pull down signal, a fourth control signal DN1 and a fifth control signal DN2 based on the third determining signal DN_CT_P, and the second determining unit 310 is further configured to generate a fourth determining signal DN_CT_P2 based on the fourth control signal DN1, the fifth control signal DN2 and the third determining signal DN_CT_P. The second control unit 330 is configured to generate the second control signal DN2UP based on the fourth determining signal DN_CT_P2.

Furthermore, with reference to FIGS. 2 and 3, it should be understood that when the balance signal HBAL_ALL is the low level signal, the third control signal UP is the low level signal, the fourth control signal DN1 is the low level signal, the fifth control signal DN2 is the high level signal, and the first control signal UP2DN is the high level signal; and when the balance signal HBAL_ALL is the high level signal, the third control signal UP is the high level signal, the fourth control signal DN1 is the low level signal, the fifth control signal DN2 is the low level signal, and the second control signal DN2UP is the low level signal.

Referring to FIG. 4, in some embodiments, the battery protection chip may further comprise a balance determining module 400. The balance determining module 400 is connected to the first control end 201, the second control end 301 and the balance signal end 202 respectively, and is configured to determine whether to start the in-pack balance based on the voltages of the batteries in the battery pack protected by the battery protection chip, and to determine whether to start the inter-pack balance based on the first control signal UP2DN and the second control signal DN2UP.

The battery protection chip according to an embodiment of the present disclosure only has two ends, which may reduce a complexity of packaging battery protection chips as well as reduce packaging cost. In addition, as external ends of the packaged battery protection chip according to the present disclosure are less, it may simplify a connection with other devices such as other battery protection chips, and facilitate a layout on an external PCB.

It will be appreciated by those skilled in the art that changes could be made to the examples described above without departing from the broad inventive concept. It is understood, therefore, that this disclosure is not limited to the particular examples disclosed, but it is intended to cover modifications within the spirit and scope of the present disclosure as defined by the appended claims.

What is claimed is:

1. An apparatus for controlling a balance of batteries, the apparatus comprising:
a first battery protection circuit and a second battery protection circuit, wherein:
the first battery protection circuit is configured to monitor voltages of a first battery pack;
the second battery protection circuit is configured to monitor voltages of a second battery pack;
each battery protection circuit comprises a first end and a second end;
the first end of the first battery protection circuit is connected to the second end of the second battery protection circuit at a first node;
when a voltage of at least one battery in the first and/or the second battery pack does not reach a balance threshold, a first pull up state is output from the first end of the first and/or the second battery protection circuits, and a second pull down state is output from the second end of the first and/or second battery protection circuits;
when voltages of the plurality of batteries in the first and/or second battery pack reach the balance threshold, a first pull down state is output from the first end of the first and/or the second battery protection circuits, and a second pull up state is output from the second end of the first and/or second battery protection circuits respectively;
when the second pull down state is output from the second end of the second battery protection circuit and the first pull down state is output from the first end of the first battery protection circuit, the first node is configured to be in a third pull up state;
when the first pull up state is output from the first end of the first battery protection circuit and the second pull up state is output from the second end of the second battery protection circuit, the first node is configured to be in a third pull down state; and
when the second pull up state is output from the second end of the second battery protection circuit and the first pull down state is output from the first end of the first battery protection circuit, the first node is configured to be in a fourth pull down state.

2. The apparatus according to claim 1, wherein the first and the second battery protection circuits are further configured to determine whether to start an in-pack balance based on voltages of batteries in the first and the second battery packs respectively, and to determine whether to start an inter-pack balance based on the state of the first node.

3. The apparatus according to claim 2, wherein the first battery protection circuit is further configured to receive a balance signal which indicates whether voltages of the plurality of batteries in the first battery pack reach the balance threshold.

4. The apparatus according to claim 3, wherein the first battery protection circuit further comprises a first circuit and a second circuit, wherein the first circuit is configured to send a first control signal to the second circuit, and wherein the second circuit is configured to send a second control signal to the first circuit;
wherein the first circuit is coupled with the first end, wherein the first circuit is further configured to control the first end based on the second control signal and the balance signal, and to output the first control signal based on the second control signal and the balance signal; and
wherein the second circuit is coupled with the second end, wherein the second circuit is further configured to control the second end based on the first control signal and the balance signal, and to output the second control signal based on the first control signal and the balance signal, wherein the first control signal is in a different state than the second control signal.

5. The apparatus according to claim 4, wherein the first circuit comprises:
a first determining circuit, configured to generate a first determining signal based on the second control signal and the balance signal;
a pull-up control circuit, configured to generate the state for the first end and to generate a third control signal based on the first determining signal;
a second determining circuit, configured to generate a second determining signal based on the third control signal and the first determining signal; and
a first control circuit, configured to generate the first control signal based on the second determining signal.

6. The apparatus according to claim 4, wherein the second circuit comprises:
a third determining circuit, configured to generate a third determining signal based on the first control signal and the balance signal;
a pull-down control circuit, configured to generate the state for the second end and to generate a fourth control signal and a fifth control signal based on the third determining signal;
a fourth determining circuit, configured to generate a fourth determining signal based on the fourth control signal, the fifth control signal and the third determining signal; and
a second control circuit, configured to generate the second control signal based on the fourth determining signal.

7. The apparatus according to claim 4, wherein the first battery protection circuit further comprises a balance determining circuit, wherein the balance determining circuit is configured to determine whether to start the in-pack balance based on the voltages of the batteries in the first battery pack, and to determine whether to start the inter-pack balance further based on the first control signal and the second control signal.

8. An apparatus for controlling a balance of batteries within a plurality of battery packs, the apparatus comprising a first battery protection circuit and a second battery protection circuit, wherein:
the first battery protection circuit is configured to monitor voltages of a first battery pack;
the second battery protection circuit is configured to monitor voltages of a second battery pack;
the first battery protection circuit comprises a first and a second current sources coupled with a first end of the first battery protection circuit, wherein the first current source is configurable to generate a state for the first end based on the voltages of the first battery pack;
the second battery protection circuit comprises a third and a fourth current sources coupled with a second end of the second battery protection circuit, wherein the third current source is configurable to generate a state for the second end based on the voltages of the second battery pack; and
the first end of the first battery protection circuit is connected to the second end of the second battery protection circuit at a first node, wherein the second current source of the first battery protection circuit is capable of changing the state of the second end of the second battery protection circuit, and wherein the fourth current source of the second battery protection circuit is capable of changing the state of the first end of the first battery protection circuit.

9. The apparatus according to claim 8, wherein:
when a voltage of at least one battery in the first battery pack does not reach a balance threshold, the first end of the first battery protection circuit is configured to be in a first pull-up state;
when a voltage of at least one battery in the second battery pack does not reach the balance threshold, the second end of the second battery protection circuit is configured to be in a second pull-down state; and
when voltages of all the batteries in the first and second battery packs reach the balance threshold, the first end of the first battery protection circuit is configured to be in a first pull-down state, and the second end of the second battery protection circuit is configured to be in a second pull-up state.

10. The apparatus according to claim 9, wherein:
when the first end of the first battery protection circuit is in the first pull-up state and when the second end of the second battery protection circuit is in the second pull-up state, the first node is configured to be in a third pull-down state;
when the first end of the first battery protection circuit is in the first pull-down state and when the second end of the second battery protection circuit is in the second pull-down state, the first node is configured to be in a third pull-up state; and
when the first end of the first battery protection circuit is in the first pull-down state and when the second end of the second battery protection circuit is in the second pull-up state, the first node is configured to be in a fourth pull-down state.

11. The apparatus according to claim 9, wherein the first battery protection circuit is further configured to receive a balance signal which indicates whether a voltage of at least one battery in the first battery pack does not reach the balance threshold.

12. The apparatus according to claim 11, wherein the first battery protection circuit comprises a first circuit and a second circuit;
wherein the first circuit is configured to generate a first control signal based on the balance signal, and to send the first control signal to the second circuit; wherein the second circuit is configured to generate a second control signal based on the balance signal, and to send the second control signal to the first circuit;
wherein the first circuit is coupled with the first end and is further configured to control the first end based on the second control signal and the balance signal; and
wherein the second circuit is coupled with the second end and is further configured to control the second end based on the first control signal and the balance signal.

13. The apparatus according to claim 12, wherein the first and the second battery protection circuits are configured to determine whether to start an in-pack balance based on voltages of batteries in the first and the second battery packs, and to determine whether to start an inter-pack balance based on the state of the first node.

14. The apparatus according to claim 13, wherein the first battery protection circuit further comprises a balance determining circuit, wherein the balance determining circuit is configured to determine whether to start the in-pack balance based on the voltages of the batteries in the battery, and to determine whether to start the inter-pack balance further based on the first control signal and the second control signal.

* * * * *